Sept. 7, 1965 C. K. RAZAK 3,204,895
AERIAL MATERIAL DISTRIBUTING METHOD AND APPARATUS
Filed Sept. 9, 1963 9 Sheets-Sheet 3

INVENTOR.
CHARLES K. RAZAK
BY
John H. Widdowson
ATTORNEY

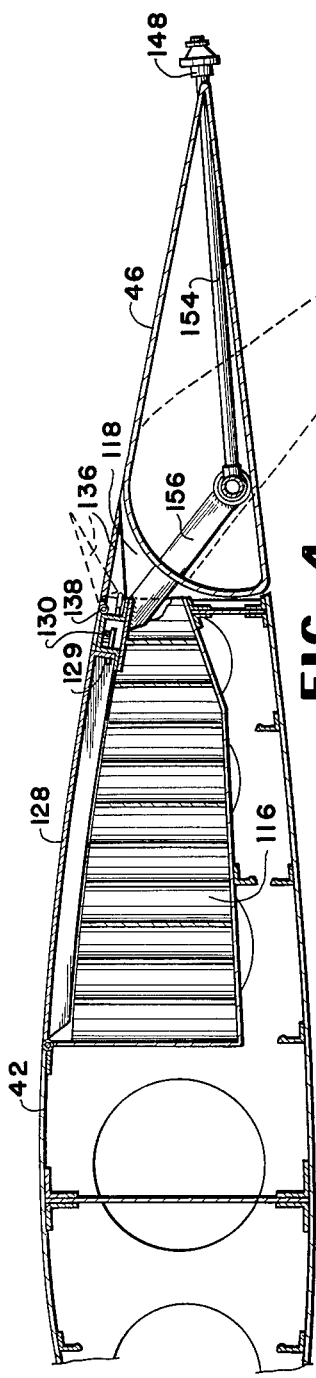
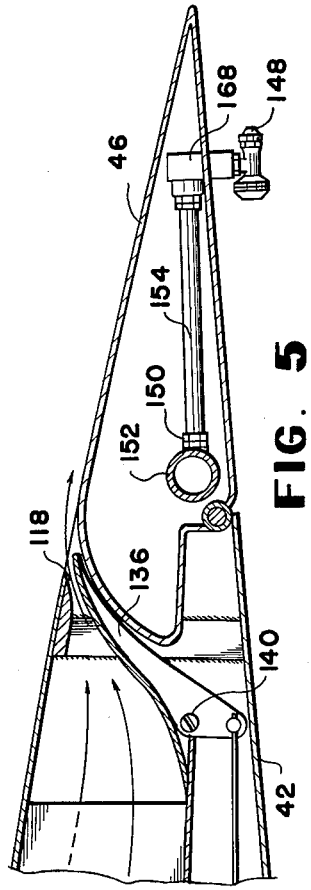
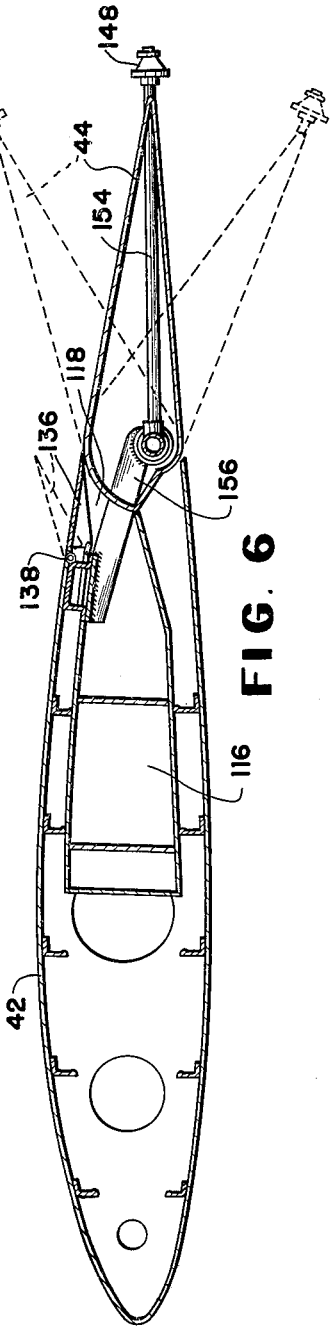
INVENTOR.
CHARLES K. RAZAK

Sept. 7, 1965　　　　　　　　C. K. RAZAK　　　　　　　3,204,895
AERIAL MATERIAL DISTRIBUTING METHOD AND APPARATUS
Filed Sept. 9, 1963　　　　　　　　　　　　　　　9 Sheets-Sheet 5

INVENTOR.
CHARLES K. RAZAK
BY
John H. Widdowson
ATTORNEY

Sept. 7, 1965  C. K. RAZAK  3,204,895
AERIAL MATERIAL DISTRIBUTING METHOD AND APPARATUS
Filed Sept. 9, 1963  9 Sheets-Sheet 6

INVENTOR.
CHARLES K. RAZAK
BY
John H. Widdowson
ATTORNEY

Sept. 7, 1965   C. K. RAZAK   3,204,895
AERIAL MATERIAL DISTRIBUTING METHOD AND APPARATUS
Filed Sept. 9, 1963   9 Sheets-Sheet 7

INVENTOR.
CHARLES K. RAZAK
BY John H. Widdowson
ATTORNEY

Sept. 7, 1965   C. K. RAZAK   3,204,895
AERIAL MATERIAL DISTRIBUTING METHOD AND APPARATUS
Filed Sept. 9, 1963   9 Sheets-Sheet 9

FIG. 24

INVENTOR.
CHARLES K. RAZAK
BY John A. Widdowson
ATTORNEY

United States Patent Office 3,204,895
Patented Sept. 7, 1965

3,204,895
AERIAL MATERIAL DISTRIBUTING METHOD
AND APPARATUS
Charles K. Razak, 2415 Mesita, Wichita, Kans.
Filed Sept. 9, 1963, Ser. No. 307,459
15 Claims. (Cl. 244—136)

This invention relates to aerial distribution of material. More specifically this invention relates to new methods of, and apparatus for aerial distribution of material. Still more specifically this invention relates to new methods of distributing dry and liquid materials from an airplane, and to new combination apparatus for such distribution. Still more specifically, this invention relates to new methods of aerial distribution wherein the dispersion pattern of the distributed material can be predicted and controlled. Yet another aspect of this invention relates to new apparatus for aerial distribution of material wherein the nature of the dispersion pattern produced can be controlled to a degree hitherto believed impossible. The invention also relates to a method of aerial distribution of material wherein the material is injected into a predetermined and controlled trailing vortex system, and is thereby dispersed by same, and also to an apparatus for carrying out the method.

This application is a continuation-in-part of my application entitled "Airplane Specifically Designed for the Aerial Application of Either Liquids or Finely Divided Dry Materials," Serial No. 216,952, filed August 13, 1962, now abandoned.

In general the aerial distribution of material, such as fertilizer, seeds, insecticides, and the like, is old in the art. However, the aerial distribution methods and the apparatus known to the art have been unsatisfactory for a number of very important reasons. The methods of, and apparatus for the aerial distribution of material do not provide sufficient uniformity of the dispersion pattern. Further, the dispersion pattern cannot be predicted and controlled as to swath width, uniformity of distribution, etc. to the degree desired. The known methods of aerial distribution, in general consist of a rather haphazard metering of material from a moving airplane or other airborne vehicle. In general, in the known methods and with the known apparatus the material being distributed is literally dumped from the airplane or other airborne vehicle and is dispersed by the air blast from the propeller or other moving aerodynamic element. Further, the forward momentum of the airplane is imparted to the material as it is metered from the plane causing the material to swirl, break into smaller particles, etc. making the width and distribution pattern of the material very difficult to predict. Material distributed from airplanes or other airborne vehicles in the manner known to the prior art cannot be controlled to the degree necessary to make aerial distribution of material sufficiently dependable and inexpensive to be used for many potential applications. For example, the material is likely to drift, etc. spoiling the distribution pattern, the uniformity of application, and often causing destruction to nearby crops, trees, lawns, etc. depending upon the material used. For example, weed killers, insecticides, and the like often also kill shrubs, trees, flowers and various types of crops if inadvertently allowed to come into contact with them. Therefore, it is apparent that the methods and apparatus for aerial distribution of material as known to the prior art do not have the necessary predictability as to pattern and dispersion to allow these methods and apparatus to become widely utilized in many applications.

I have invented an apparatus for distributing dispersible materials. The apparatus of my invention is an airplane having a wing, an adjustable aerodynamic surface on the wing adapted to influence and control the resulting trailing vortex system of the wing when in motion, and a means for expelling air rearwardly in close proximity to the wing. The apparatus of my invention also includes means on the airplane to contain materials to be distributed, and means in communication with said means to contain adapted to expel the dispersible material at preselected locations along the wing into the trailing vortex system of the wing which is generated while the airplane is in flight. The trailing vortex system which is controlled by the adjustable aerodynamic surface on the wing is utilized to distribute the dispersible material into a predetermined swath pattern.

A preferred specific embodiment of my apparatus has a material dispensing means adapted to entrain granular dry material in an enclosed stream of air to fluidize the granular material and subsequently eject the stream of air and fluidized solids rearwardly from the wing of the airplane. The openings from which the stream of air having material entrained therein is expelled can be readily controlled as to size and location. This preferred specific embodiment also includes a separate liquid distribution system adapted to spray liquid material rearwardly from the trailing edge of the wings into the trailing vortex system. The dry material fluidized in the stream of air or the liquid sprayed rearwardly from the trailing edge of the airplane is subsequently dispersed and distributed into a predetermined swath pattern by the trailing vortex system of the wing.

The new method of distributing dispersible materials of my invention includes the steps of causing the formation of a trailing vortex system behind a moving aerodynamic element maintained in spaced relationship to the ground, forcing a stream of air rearwardly at a velocity equal to or in excess of the forward velocity of the aerodynamic element, and expelling dispersible material into the trailing vortex system utilizing the vortex system to distribute the dispersible material. In my new method of distributing dispersible materials the distribution pattern of the swath produced can preferably be varied to suit the individual requirements of the distribution project by altering the trailing vortex system and/or expelling the dispersible material in selected locations along the moving aerodynamic element.

The new apparatus for distributing dispersible materials of my invention solves problems associated with distributing apparatus known to the prior art. My new apparatus makes possible a controlled and predictable swath pattern. The swath pattern can be varied to suit the individual distribution project requirements by altering or changing one or more of the many variables available. The apparatus can be used to distribute a very wide, even swath pattern, or in alternative to distribute a very narrow concentrated swath pattern which can be utilized, as for example, for spreading salt or other de-icing compounds on roads, highways and the like. The apparatus of my invention can very effectively be used to sow seeds, as for example, rice, to fertilize crops, to spray or distribute insecticide, liquid or otherwise, and many other similar applications requiring the use of fast, dependable, distribution of a dispersible material. Because of the versatility of my apparatus and vastly improved swath pattern the cost of distributing material is reduced. For example, since the width of the swath can be made very broad, my apparatus can cover a relatively large acreage in less time than with prior known distributing apparatus.

A preferred specific embodiment of my invention is adapted to distribute either liquid or dry material, the change from one type of material to the other requiring only minor adjustments. When using my apparatus to distribute material, less drift of the material is encountered.

This reduction in the drift of material is very important in aerial spraying or distribution of material particularly insecticides, seeds, and materials used in weed control. It is apparent that a drifting of certain types of material to areas where the material is not desired could have serious consequences. For example, material used in weed control could also kill bushes, grass, flowers, etc. if allowed to come into contact with them. The apparatus of my invention reduces the amount of the drift of material by developing a favorable trailing vortex system which deposits the material in the area desired, and also reduces the break-up of the material by reducing the amount of turbulence that the material is subjected to. In my apparatus dry material being distributed is ejected rearwardly at a velocity equal to or greater than the forward speed of the plane. Thus, the material upon leaving the airplane is at very nearly zero velocity relative to the ground and is free to fall straight downwardly, or to be gently spread in the desired direction by the vortex system. Reduction in the break-up of material is important in both dry granular material and also liquid material. Another important advantage of the apparatus of my invention, namely the plane, is that the plane is made more maneuverable and therefore safer. The effect of ejecting a stream of air rearwardly in the intermediate area of the wings of the plane has the effect of increasing the lift coefficient of the wing. Increasing the lift coefficient of the wing enables the plane to either fly more slowly, or to climb, assuming that the angle of attack and velocity are the same, and also increases the load capacity of the plane. The apparatus of my invention can be used to perform many distribution operations hitherto not envisioned or believed possible such as the spreading of salt on highways and roads to melt ice and snow.

The method of my invention solves many of the problems associated with methods of distributing material known to the prior art. In my new method the dispersion pattern of the material being distributed is predictable and can be easily and readily controlled to obtain any desirable type of dispersion pattern. In using the new method of my invention, the amount of drift of material is materially reduced. This drift is reduced by the formation of a desirable trailing vortex pattern by the wings which deposits the material in a known predictable manner, and also because the material or droplets of liquid, depending on the type of material being spread, does not break-up after it is ejected from the plane. The break-up of material is reduced because of the desirable vortex pattern, and also because the material is ejected rearwardly at such a velocity that the relative velocity of the drop with respect to the air is low. Specific embodiments of the method of distributing material of my invention makes possible a much broader, more uniform dispersion pattern of material which materially reduces the cost of application. This reduction in the cost of the application of material enables the aerial distribution of material to compete with conventional aerial distribution procedures and methods and thereby enlarge greatly the number of applications where it will be used.

An object of this invention is to provide a new method of aerial distribution of material.

Another object of this invention is to provide new apparatus for the aerial distribution of material.

Still another object of my invention is to provide new methods of aerial distribution and apparatus for performing same wherein the distribution pattern can be predicted and controlled with a high degree of accuracy.

Yet another object of this invention is to provide new methods and apparatus for aerial distribution wherein there is less break-up of material and therefore less drift.

Another object of this invention is to provide new methods and apparatus for aerial distribution of material which will materially reduce the cost of the application and increase the number of applications where it may be used.

Another object of this invention is to provide an airplane combination apparatus for the aerial distribution of dispersible material which is more maneuverable and safer to use.

Another object of this invention is to provide a new method and apparatus for the aerial distribution of material which makes possible the precise control of the width of a swath of material and enables the material to be uniformly distributed.

Yet another object of this invention is to provide a new apparatus which is adapted to distribute either liquid or dry material.

Other objects and advantages of the invention will be apparent to those skilled in the art from the disclosure set forth herein.

Drawings of preferred specific embodiments of the invention and examples of testing procedures and the results thereof accompany and are a part hereof, and such are to be understood to not unduly limit the scope of the invention. In the drawings, FIG. 1 is a preferred specific embodiment of the combination apparatus for distributing material of the invention.

FIG. 4 is a transverse cross sectional view taken on line 4—4 of FIG. 2.

FIG. 5 is an enlarged cross sectional view illustrating another preferred specific embodiment of my invention, wherein there is provided a slot adjuster flap mounted within the wing section.

FIG. 6 is a transverse cross sectional view taken on line 6—6 of FIG. 3.

FIG. 24 is a plot of the results of an experimental test run described in Example I.

Figure 1:
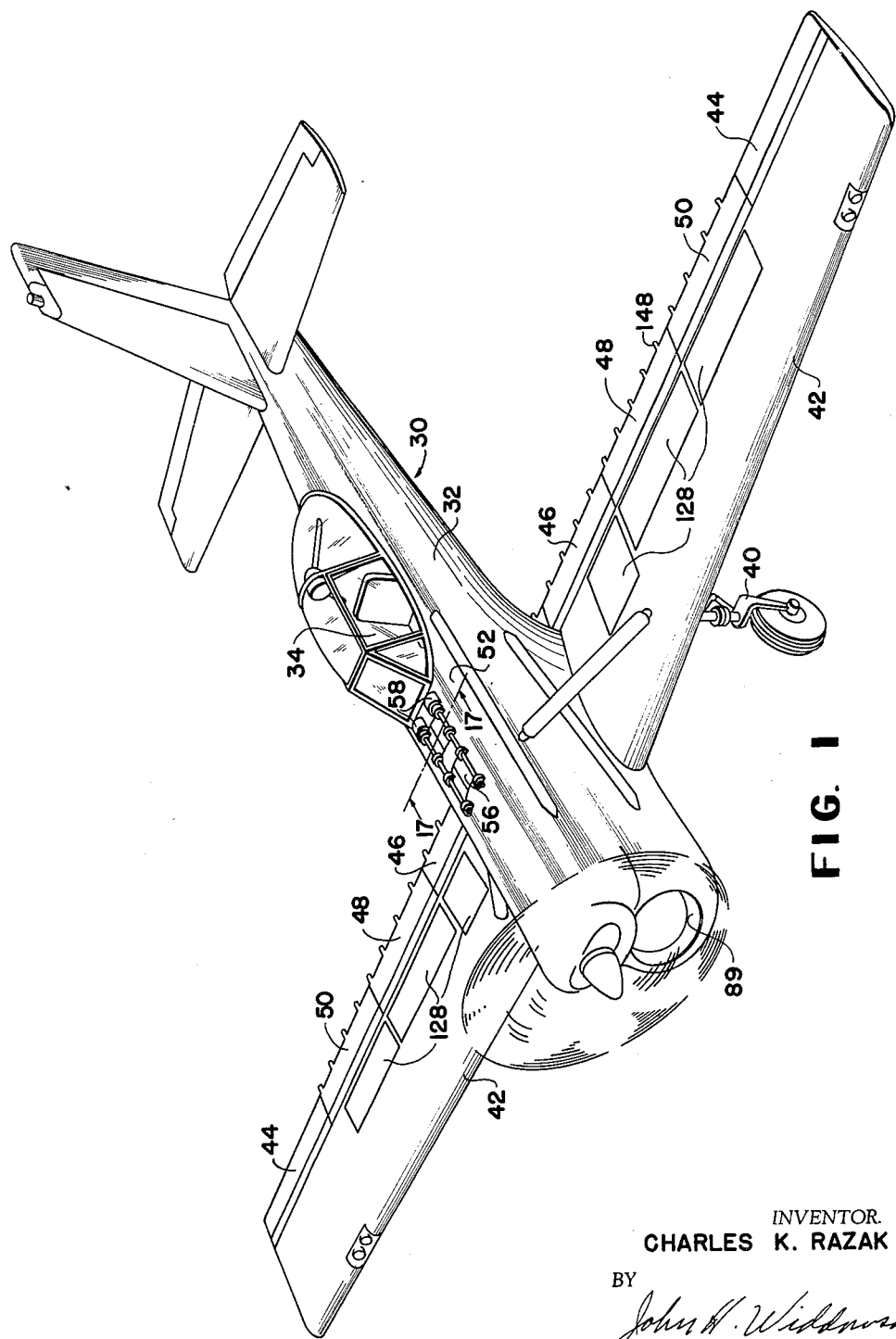

The following is a discussion and description of the new method and apparatus for distributing material of my invention and examples obtained in testing a model apparatus embodying the structural features of my invention, made with reference to the drawings, wherein the same reference numerals are used to indicate the same or similar parts and/or structure. The discussion and description are of preferred specific embodiments of the new method and apparatus of my invention and it is to be understood that such are not to unduly limit the scope of my invention.

Referring now to drawings, FIGS. 1–24, there is illustrated apparatus 30 of my invention for distributing materials. Apparatus 30 of my invention is an airplane having a fuselage 32 including a cockpit 34, an engine 36 having an independent throttle means 38 within cockpit 34, a landing gear 40, and a single wing 42 mounted low on fuselage 32. The wing 42 has ailerons 44 mounted on the end portions thereof, and three separate hingedly mounted flaps 46, 48 and 50 respectively mounted on the trailing edge of each of the extending portions of wing 42. The flaps 46, 48 and 50 are controllable from within the cockpit with the usual and conventional control means. It is understood that in the practice of my invention any suitable type and size of airplane can be used in the apparatus and method of my invention.

Figure 11:
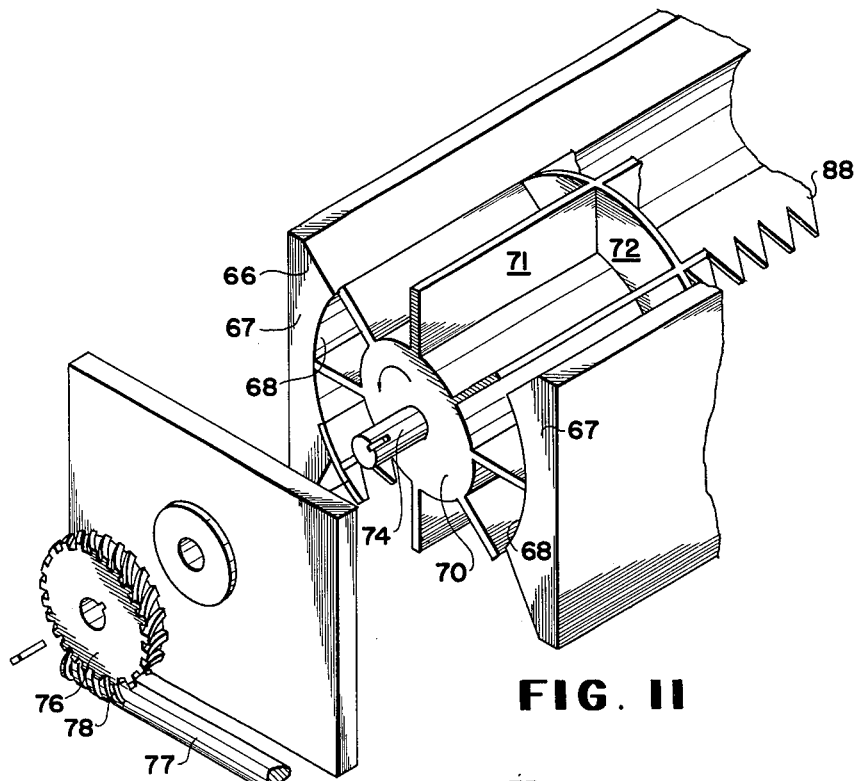
FIG. 11 is an exploded view of a preferred specific embodiment of the metering valve of my invention.
Figure 12:
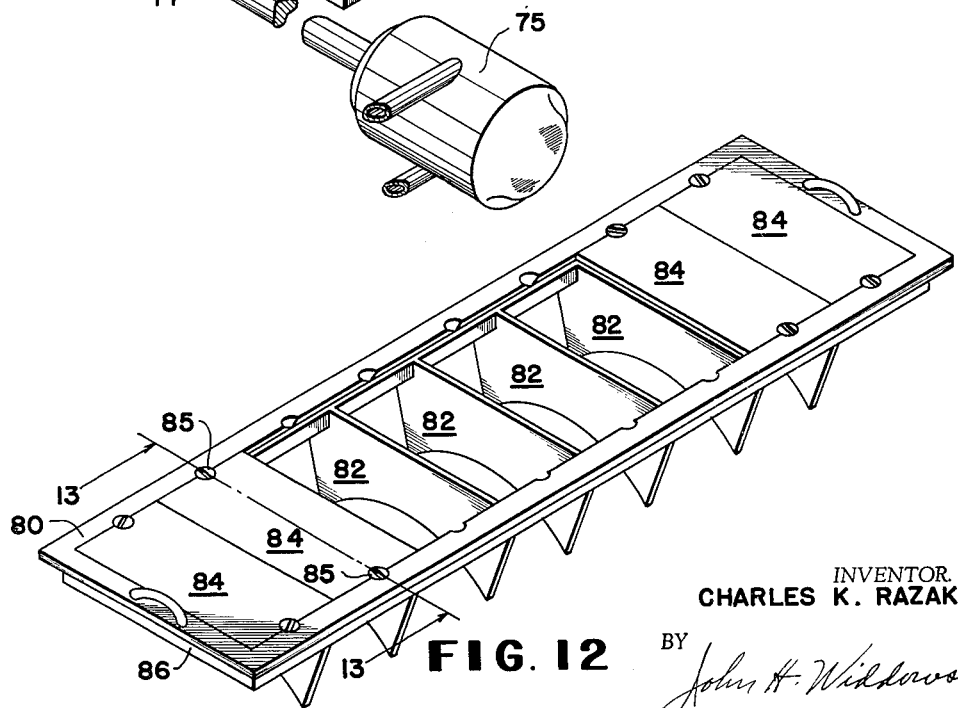
FIG. 12 is a detail view of the frame and plate means positioned above the metering valve.
Figure 13:
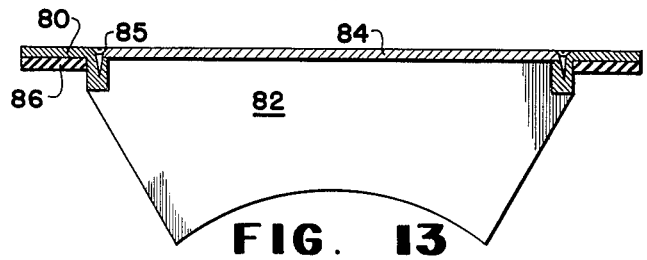
FIG. 13 is a transverse view in cross section taken on line 13—13 on FIG. 12.
Figure 14:
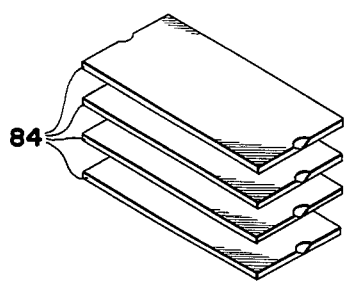
FIG. 14 is a view showing a plurality of plates for use in the frame means illustrated in FIG. 12.

A means is provided on the airplane for distributing material when the airplane is in flight. This means includes a hopper 52 mounted in fuselage 32 forwardly of the cockpit 34. The hopper 52 has a relatively large inlet opening 54 consisting of hingedly mounted closures 56 covering inlet opening 54. The closures 56 are pivotally mounted to the fuselage by a hinge means 57 having longitudinal axes parallel to the longitudinal axis of the fuselage of the plane. Hydraulic motors 58 are used to open and close closures 56 which hydraulic motors have preferably a control within the cockpit 34. With this arrangement the pilot can taxi up to an apparatus for loading the material in the hopper, quickly open the closures 56 from within the cockpit, load the material, close the closures, and taxi away preparatory to distributing the material. The hopper is preferably provided with a means to quickly dump the material in the hopper in the event of an emergency or the like. The means to dump the material consists of a tubular-like outlet 60 and a closure 61 covering the outlet 60. The closure 61 is manipulated by a suitable actuating means 62 from within the cockpit 34 of the airplane. The dumping means is adapted to either dump liquid or dry material from the hopper 52. A first outlet opening 64 is provided in the bottom of hopper 52. Preferably the hopper 52 is provided with sloping walls 65 which are adapted to channel the material disposed in the hopper toward the first outlet opening 64. A rotary metering valve 66, shown in exploded detail in FIG. 11, is provided to accurately control the rate that material is released through outlet opening 64. The metering valve 66 has a housing 67 having a transverse horizontally extending cylindrically shaped recess 68 provided with top and bottom openings. A vaned rotary valve body 70 is disposed in recess 68. The rotary valve body 70 has longitudinally extending vanes 71 with connecting radial vanes 72 disposed in spaced relation along the longitudinal axis of the valve body 70. A shaft 74 supports valve body 70 in the housing 67. A worm gear 76 is fixed to the end of shaft 74. A variable speed hydraulic motor 75 provided with a shaft 77 having a helical thread 78 operatively engages the worm gear 76 to rotate the valve body 70. The first outlet opening 64 also is provided with a means to selectively block the material disposed in the hopper from portions of the top opening of the housing 67. This means is a rectangular frame 80 disposable in sealed relation to the top opening in valve 66. Frame 80 is shown in detail in FIGS. 12 and 13 of the drawings. Frame 80 is provided with vertically extending spaced dividers 82 secured to the frame 80. A plurality of flat removable plates 84 are provided which are adapted to selectively cover portions of the opening in frame 80 defined by the spaced dividers 82. Bolt means 85 are provided for securing the removable plates 84 to the frame 80. As shown in FIG. 13 a sealed connection between the valve body housing 67 and the frame 80 is achieved by providing a seal 86 of resilient material. The complete assembly associated with frame 80 can be lifted off the housing 67 of the rotary valve 66 by opening the hopper closures 56 and lifting the frame 80 off the top of the rotary valve 66 either by hand or with a suitable lifting instrument. A means to secure frame 80 in position can be provided if desired. Preferably the radial vanes 72 on the rotary valve body 70 are aligned with the spaced dividers 82 on frame 80. Also, the metering valve 66 is provided with a plate 88 provided with protruding teeth which prevents the material being dispensed from the hopper 52 by the rotary valve body 70 from being released in pulses each time a vaned edge 71 passes the edge of the housing 67. With the aforedescribed rotary valve means and rectangular frame 80, the rate of feed as well as the position of feed, from the hopper can be controlled by either varying the speed of the hydraulic motor 75 and/or positioning plates 84 in frame 80.

A compressor 90 is mounted below engine 36 communicating with air intake 89 positioned in the forward end of the fuselage 32. The compressor 90 includes a housing 91, a longitudinally extending rotatable shaft 92, a mounting means 94 for said shaft 92, bearing means 93 rotatably supporting the shaft 92, a fan 96 fixed to the end of shaft 92, and a pulley 98 also fixed to shaft 92. A second engine 100 is mounted in the fuselage 32 below first engine 36 and rearwardly of compressor 90. An independent throttle means 102 in cockpit 34 is provided for the second engine 100. A pulley 104 is mounted on the driving shaft of engine 100 and a plurality of belts 106 are mounted on pulleys 98 and 104 to provide a driving relationship between engine 100 and compressor 90. Preferably an extensible means 108 is provided to adjust the tension of belts 106. However, the compressor can be driven with any suitable means, as for example gears, shafts, chains, hydraulic or electrical means, etc. if desired.

The auxiliary engine 100 provides a constant steady source of power for operating the compressor, irrespective of flight conditions. Thus, there is always available adequate power for driving the compressor regardless of whether the airplane is climbing, and/or whether the airplane is fully loaded or practically empty, and regardless of air speed or headwinds.

Figure 2:
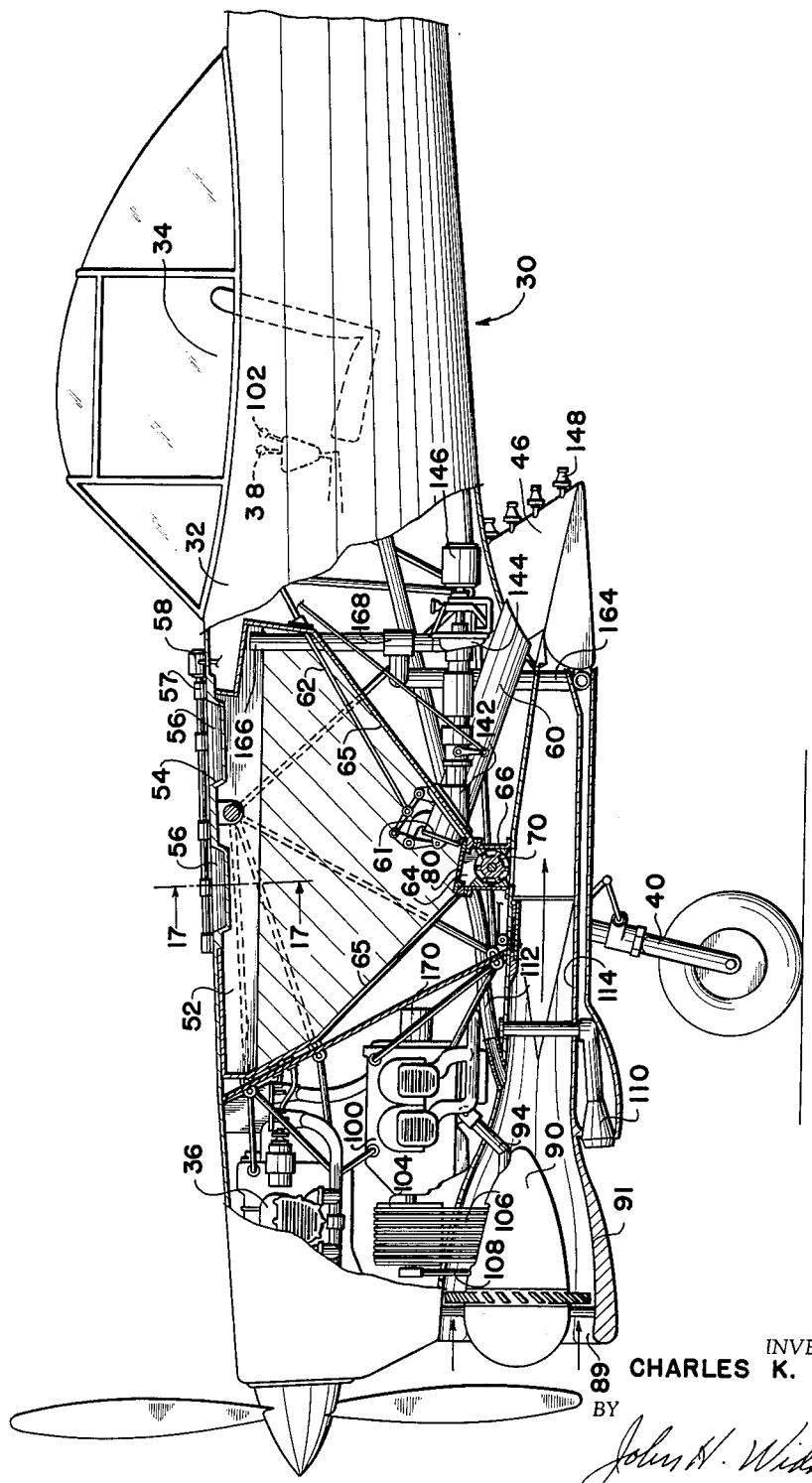
FIG. 2 is a side view in broken cross section of a preferred specific embodiment of the airplane for distributing material of my invention.

Preferably a suitable air intake 110 is provided to supply fresh air to engine 100 which intake extends below intake 89. As shown in FIG. 2, there is provided a cabin ventilation system consisting of a conduit 112 which extends between the outlet of the compressor and the cockpit 34. The ventilation system forces clean air under pressure to the cockpit of the plane thereby keeping the interior of the cockpit under a pressure slightly above atmospheric. This prevents dust, insecticides, odors emanating from the hopper, etc. from entering the plane cockpit and causing discomfort or possible injury or asphyxiating or poisoning to the pilot.

Figure 3:
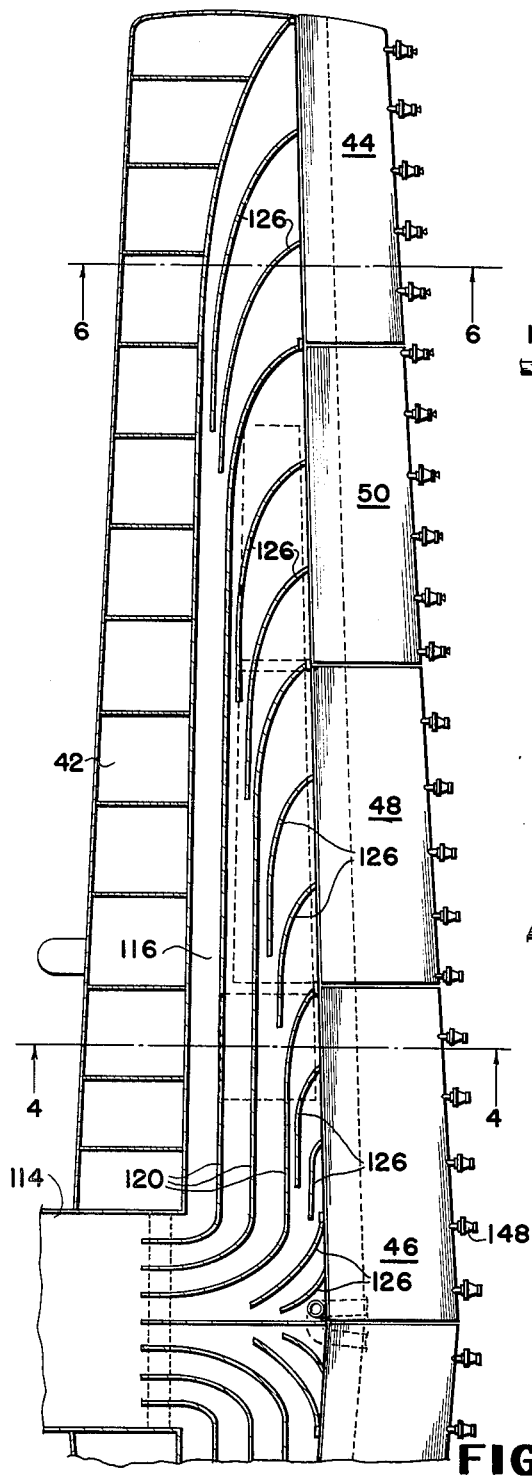
FIG. 3 is a top view in cross section of a wing section of the airplane illustrating the duct system, flap system and spray nozzles mounted thereon.
Figure 10:
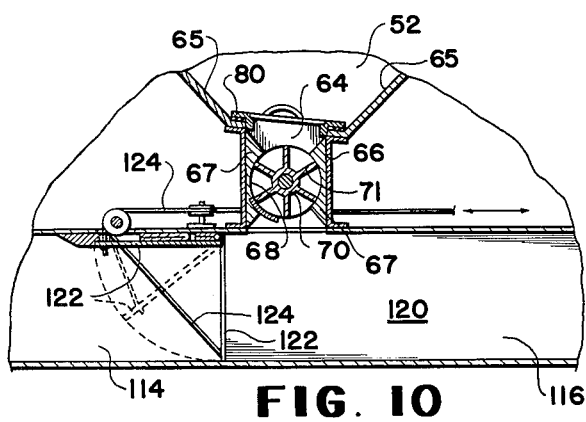
FIG. 10 is a detail view of a preferred specific embodiment of my invention of the duct blocking means.

A duct means is provided to channel the air flowing from compressor 90 to the desired locations on the trailing edge of the wing. This duct system includes a first longitudinally extending duct 114 connected at one end to the housing 91 of compressor 90. Distribution ducts 116 connected to the other end of duct 114 are positioned in each of the wing portions. The metering valve 66, described hereinbefore, communicates with the distribution duct 114 and the hopper 52. The distribution ducts 116 communicate with the other end of the first duct 114 and have outlets 118 extending along the entire length of the wing 42 positioned forwardly of the leading edge of the flaps 46, 48 and 50 and ailerons 44. The outlets 118 of the distribution duct 116 are clearly shown in FIGS. 4 and 5 of the drawings. As shown in FIG. 3 there is provided a plurality of upstanding spaced walls 120 in the distribution ducts 116, the number and spacing of the wall portions 120 adjacent the metering valve and dividers being in alignment. The walls 120 are adapted to channel material and air when flowing in the ducts to various portions of the outlets 118 in the wing. As shown in FIG. 3 the walls 120 are positioned in ducts 116 to channel the flow of material and air to the outlets 118 adjacent the respective flap or aileron. As shown in FIG. 10, there is provided a plurality of hingedly mounted panels 122 in the distribution duct 114 positioned ahead of the metering valve 66 which are adapted to selectively control the flow of air through the portions of the duct 116 defined by the walls 120. The panels are pivotally mounted on the top surface of the duct and are provided with a suitable actuating means 124 for opening and closing the panels from within the cockpit. The panels 122 preferably correspond in number and width to plates 84 of frame 80. The actuating means is a cable 124 secured to the panel 122 which is controlled from within the cockpit 34. The panels 122 are preferably of such a width so that each covers only a selected portion of the distribution duct 116, namely a portion which feeds or supplies air to one of the outlets associated with a respective flap or aileron of the wing. If desired panels 122 can be omitted and the flow of air and material controlled solely with slot adjuster flaps, which will be described. Distribution baffles 126 are positioned between the walls 120 and adjacent the outlets 118 of the distribution ducts 116. The distribution baffles 126 serve to distribute the flow of air uniformly along outlet openings 118. The distribution baffles 126 also have the effect of forcing the stream of air emanating from outlet opening 118 in a more rearwardly direction. A plurality of inspection and cleaning doors 128 are provided in the top surface of the wings 42 forming the top walls of the distribution ducts 116.

Figure 7:
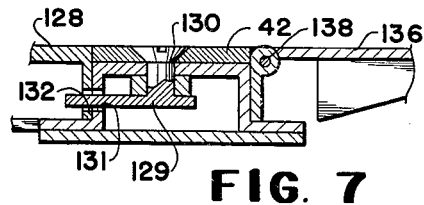
FIG. 7 is a detail view illustrating a preferred specific embodiment of the locking mechanism of the inspection panels mounted on the wings.
Figure 8:
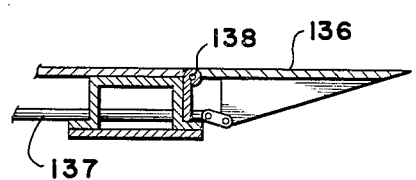
FIG. 8 is an enlarged detail view of a preferred specific embodiment of the adjuster flap.
Figure 9:
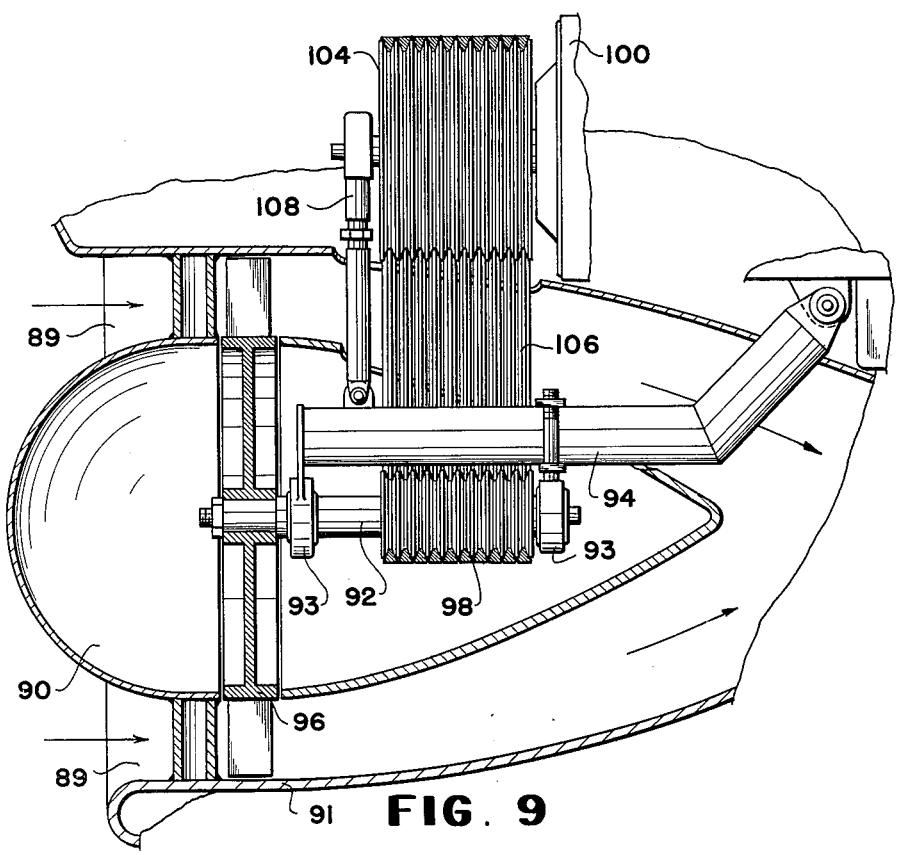
FIG. 9 is a detail view illustrating a preferred specific embodiment of the compressor and driving arrangement thereof.

The cleaning and inspection doors 128 are secured in closed position by a suitable lock of the type shown in FIG. 7. The lock consists of a rotatable bolt 130 mounted in the wing 42 in a channel or other reinforcing element of the wing forwardly of the outlet openings 118 of the distribution ducts 116. Secured to bolt 130 is a horizontally extending lug 129. The lug 129, which can be rotated about the axis of bolt 130, is adapted to enter aligned apertures, namely aperture 131 in the wing 42, and aperture 132 in inspection door 128. The lock can be opened by merely inserting a screwdriver or similar device into the slot in bolt 130 and rotating it to thereby pivot the lug 129 from the aligned apertures 131 and 132 thereby permitting door 128 to be opened.

Slot adjuster flaps 136 are provided for controlling the outlet openings 118 of the distribution ducts 116. The adjuster flaps 136 are pivotally mounted flaps corresponding in length to the adjacent associated flap or aileron. A hinge means 136, mounted on the top surface of wing 42 forwardly of the flaps or ailerons, secures the adjuster flaps to the wing. A suitable actuating means is provided to control the movement and positions of the slot adjuster flaps 136 from the cockpit. The actuating means can be a rod 137 secured to a hydraulically operated piston and cylinder means mounted on the wing.

Preferably the slot adjuster flaps have a stop means or other means that prevents their complete closing. There remains a very small narrow opening which causes the air stream to issue forth at a materially higher velocity than when the slot adjuster flaps are open. Preferably a means is also provided to correlate the stopping of the metering valve and the closing of the slot adjuster flaps.

Another preferred embodiment of the slot adjuster flaps is illustrated in FIG. 5 of the drawings. In FIG. 5 there is shown a slot adjuster flap 136 pivotally mounted at the point 140 within the wing 42. The flap 136 in the embodiment shown in FIG. 5 is also provided with a suitable actuating means to actuate same from within the cockpit. Preferably a means is provided to correlate the action of the slot adjuster flap actuating means and the rotary valve power means. When the rotary valve is stopped halting the dispensing of material at the end of a swath the slot adjuster flaps are partially closed to increase the velocity of the issuing air stream.

Figure 15:
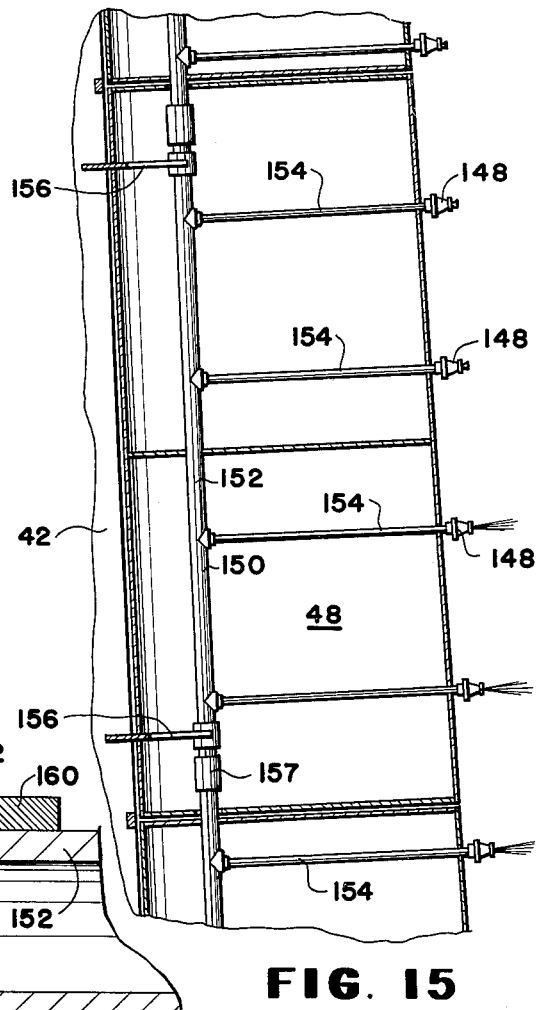
FIG. 15 is a detail view in broken cross section of the conduit system for supplying liquid to the nozzles mounted in the flaps and ailerons.
Figure 16:
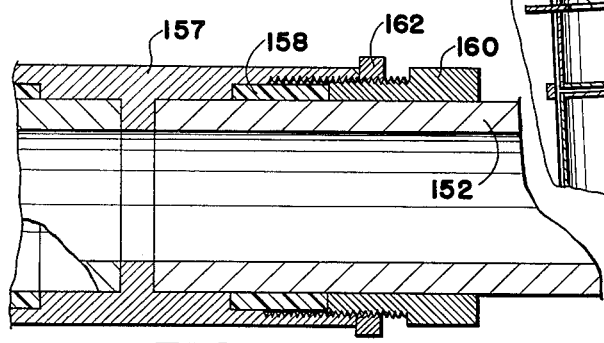
FIG. 16 is a cross sectional view illustrating a rotatable conduit connection of the conduit system of my invention.
Figure 17:
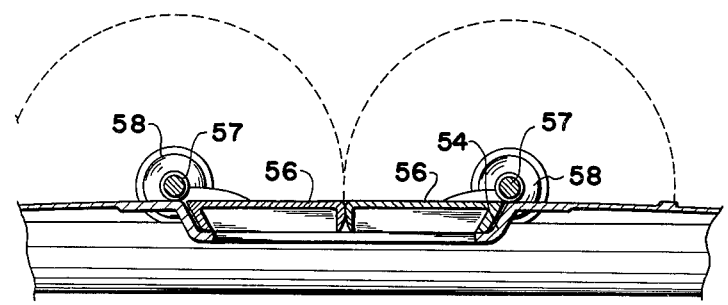
FIG. 17 is a detail view in cross section taken on line 17—17 of FIG. 1 illustrating the hopper closure arrangement.

A separate means to selectively distribute liquid material is also provided on the apparatus of my invention. It consists of a second outlet opening 142 in hopper 52, a means to selectively cover the second opening 142, and a liquid pump 144 having an inlet communicating with the outlet 142. The means to selectively cover outlet opening 142 can be any suitable type of means, such as a plug, cover, etc., which can be placed in or removed from the opening by either a control within the cockpit or by manually reaching through the inlet 54 of the hopper 52. The pump 144 is driven by a variable speed hydraulic motor 146. Spaced nozzles 148 are mounted on the flaps 46, 48 and 50 and arranged to point in a rearward direction. Nozzles 148 can be also placed on the trailing edges of ailerons 44 if desired. The nozzles are provided with a means to individually and selectively control the flow through each nozzle. This means can be either a plug which can be inserted into the nozzle, a valve, or a mechanism in the nozzle itself to permit it to be closed or opened. The nozzles 148 are preferably also provided with an adjustable mechanism which will allow the cross sectional area of the opening to be varied thereby providing a control of the velocity of the liquid issuing from the nozzle. The liquid should issue forth at a velocity equal to or slightly in excess of the forward velocity of the airplane. A conduit means 150 is provided and operatively connected to the fluid pump 144 and the nozzles 148. The conduit means 150 is illustrated in FIG. 15 of the drawings and consists of conduits 152 which serve to transport the liquid laterally of the fuselage and also serve as a pivot element in the hinge arrangement for the flaps and ailerons, and smaller radially extending conduits 154 leading from conduit 152 to the individual nozzles 148. A bearing and mount 156 secured to the wing 42 and pivotally supporting conduit 152 holds the flaps and ailerons in pivotal relation. FIG. 16 shows a preferred embodiment of a pivotal connection for use in conduit 152 which provides separate portions of same to be rotated relative to adjoining portions. The connection consists of a female fitting 157 having positioned therein a resilient annular seal 158, a packing nut 160, and a locking nut 162. The conduit system 150 includes a conduit 164 leading from pump 144 to conduit 152, and a return pipe 166 leading from the pump 144 to the interior of hopper 52. A relief valve 168 is provided at the junction of conduit 164 and 166 which allows liquid pumped by pump 144 to return to the hopper 52 in the event that a high build-up of pressure occurs in the conduit system.

Another specific embodiment of my conduit means 150 is illustrated in FIG. 5 of the drawings. This conduit system is very similar to the conduit system previously described. The conduit system has conduits 152, radially extending smaller conduit elements 154 leading from conduit 152, and downwardly extending fixtures 168 affixed to the end of conduit elements 154, and spray nozzles 148. In this embodiment the spray nozzles are mounted below the surface of the flap or aileron adjacent the trailing edge thereof.

The apparatus for distributing materials of my invention is provided with a fluid pump 170 mounted on and driven by auxiliary engine 100. Fluid pump 170 supplies the power for driving the various fluid motors and control actuating mechanisms on the plane. The pump 170 is used to drive the closure motors 58, the actuating means for the slot adjuster flaps, the pump motor 146, the fluid motor 75 powering the metering valve 66, and other hydraulically actuated controls on the airplane 30.

The new method of aerial distribution of dispersible materials of my invention is a vastly improved method of aerial distribution and represents a very great step forward in the art of aerial distribution. With my new method the swath pattern can be accurately controlled as to width, rate of application, etc. Further, the material being distributed has much less tendency to drift than with conventional methods of aerial distribution known to the prior art. Since the swath pattern and drift can be positively controlled with my new method of aerial distribution, the method can be used in new applications which prior known methods were completely unsuited to perform. Further, my method of aerial distribution and the apparatus for distributing the material is safer to operate.

A preferred method of aerial distribution of my invention is concerned with the spreading of dry finely divided materials in a wide swath having a relatively uniform material dispersion. The material being distributed is entrained in a moving enclosed stream of air, so that the material is fluidized. Entraining and fluidizing the material is accomplished by metering it into the enclosed stream of air emanating from the compressor 90 in my apparatus. After the material has been entrained in the moving enclosed stream of air, the air is conveyed outwardly along the wing 42 of the airplane and expelled rearwardly from the trailing edge of the top surface of the wing into the trailing vortex system set up by the wing forwardly of the flap at a velocity equal to or in excess relative to the plane of the forward velocity of the plane. When the material is expelled in this manner it has a velocity relative to the ground of approximately zero miles per hour. This leaves the expelled particles or droplets of material to float or drop downwardly to the ground entirely free of any forward motion. By expelling the fluidized material in this manner, the turbulance that it is exposed to is greatly reduced thereby reducing or eliminating particle break-up of the particles. Since there is very little or no break-up of the material, and very little turbulence the particles of material fall rapidly to the ground reducing or eliminating drift.

Figure 19:
FIGS. 19, 20, 21 and 22 show profile views of wings which illustrate preferred settings of the flaps for use in the method of distributing material of my invention.

By expelling the material and the stream of air forwardly of the flaps, or ailerons, the material is deposited squarely in the trailing vortex of the wing. The nature of the trailing vortex of the wing in my method of operation is positively controlled with a proper setting of the flaps, which setting varies with the type of vortex system and swath pattern desired. FIGS. 19–22 of the drawings illustrate various flap settings and indicate the types and locations of vortices produced by the various settings. As indicated there are always vortices formed on the tips of the wing of an airplane in flight, which vortices are caused by the difference in air pressure between the top and the bottom surfaces of the wing. In my method of aerial distribution additional vortices are deliberately formed with various settings of the flaps. The vortices so formed are utilized to spread or to confine the material ejected from the plane while in flight to produce the desired type of swath distribution pattern. In addition, in my method of aerial distribution, the material being distributed is ejected from the airplane in predetermined locations along the wing in order to take full advantage of the trailing vortex system to spread the material in the desired manner. The material, either liquid droplets or dry particles, is stationary with respect to the ground and no secondary dispersing occurs due to forward or rearward velocity. The air mass through which the airplane is flying is also stationary with respect to the ground and secondary break-up is prevented. Lateral dispersing by means of the vortices deliberately created at strategic points along the wing is the only motion to be imparted to the particles to secure the desired distribution. I have found that the strength, location and direction of a vortex formed by a wing in flight can be predicted. In order to predict the location, strength and direction of vortices in the trailing vortex system of an airplane wing moving relative to a body of air, a wing loading curve is plotted. This curve is obtained in experimentation work by installing manometers at spaced intervals along the wing and then determining the pressure coefficient at each point. The pressure coefficient is the difference in pressure between the point on the wing and a remote point, divided by the dynamic pressure, that is the pressure due to the forward motion of the wing, which is determined with a Pitot-static tube. The values of the pressure coefficient are plotted versus wing position and a line drawn to connect the points so obtained. A steep slope portion on the curve indicates the formation of a vortex in the trailing vortex system behind the corresponding location on the wing. The strength of a vortex is proportional to the slope of a tangent line drawn to a point on the wing loading curve. Further, the rotation of the vortex created is predicted by the type of slope of the tangent line, that is whether the slope slopes to the right or to the left. For example, if a loading curve for the left-hand side of the wing shown in FIG. 19 were drawn, it would appear as a line which would slope upward sharply at the point on the abscissa corresponding to the tip of the wing, level off for a short distance, then slope sharply upward again at the point defined by the left-hand side of flap 48, and then level off to the center of the wing. A line drawn tangent to the curve at the point corresponding to the tip of the wing would slope sharply upward thereby indicating a strong vortex adjacent the tip of the wing. Another line drawn tangent to the curve at the point corresponding to the left-hand end of flap 48 would also slope sharply upward indicating the formation of another vortex at this point. As indicated in FIG. 19, the vortices formed are clockwise in direction. Had the curve sloped sharply downwardly a vortex having a counter-clockwise direction would be formed, as for example in the left wing portion of FIG. 21. The flat portions of the curve would indicate that there is no significant vortices formed at these points. When material is ejected along the forward edge of flaps 46 and 48 on a stream of air ejected rearwardly at the velocity of approximately the forward velocity of the plane, the material which has no appreciable forward or rearward velocity relative to the ground is thrown outwardly by vortex b. The strength of the vortex b will determine to what extent the material being distributed will be thrown outwardly. The strength of the vortices can be controlled by setting the flaps at various angles. In general the greater the angle of the flap the greater the wing loading in the area behind the flap and also the stronger the vortex formed on the end of the flap. The strength of the vortex can also be controlled by controlling the location and/or locations and velocity that the stream of air expelled from the trailing edge of the wing. When the stream of air is caused to flow rearwardly from a given point on the wing, the pressure coefficient at that point of the wing is increased. When the pressure coefficient is increased at any one point and remains constant or is decreased at an adjacent point the slope of a line tangent to the loading curve is increased. A sloping portion on the wing loading curve indicates that a vortex is produced at that portion of the wing all in view of the previous discussion of the wing loading curve. Therefore, the strength of vortex b in FIG. 19 could be increased by blocking the stream of expelled air with the panels 122 on outboard portions of the wing relative to flaps 48 and continuing to force the stream of air rearwardly over flaps 48 and 46.

Figure 20:

FIG. 20 shows another typical setting of the flaps for use in the method of my invention. As indicated flaps 46 are lowered which cause vortices c to be formed. Vortices c cause an outward flow of air. Material distributed with the flap setting shown in FIG. 20 with material emanating from the outlet adjacent to flaps 46 is distributed outwardly in a relatively heavy pattern in a relatively narrow swath.

In distributing material it is customary to overlap adjacent swaths to some extent. There is an inevitable tapering off of concentration at the edge of a swath which desirably is overlapped by the next adjacent swath. It is desirable that the taper off of the concentration of material occurs at a uniform rate so that when the next adjacent swath is overlapped the combined effect of the overlap of material in the adjacent swath results in an overall uniform distribution concentration of material. The vortex c is shown in FIG. 20 provides a very uniform tapering off of the concentration of material at the edges of the swath which can be overlapped to provide a very accurate uniform overall concentration.

Figure 21:
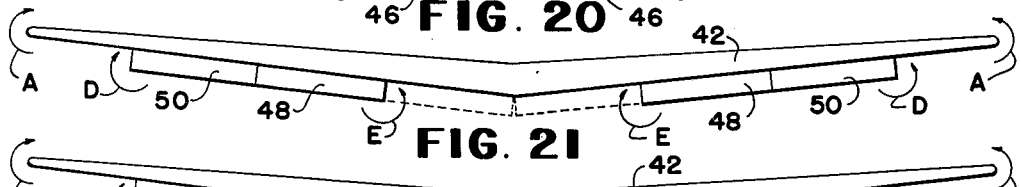

In FIG. 21 is shown still another setting of a preferred embodiment of my method of distributing material. In this figure there is shown the two outboard flaps 48 and 50 in lowered position. As indicated on the drawing there is formed vortices d on the outside edges of flaps 50, and oppositely rotating vortices e on the inboard edges of flaps 48. When material is distributed along the inboard portions of the wing 42 between flaps 48 on the respective parts of the wing the vortices e tend to throw the material inwardly. Vortices d which are relatively far removed from the area that the material is distributed have very little effect on the distribution. Therefore with the setting shown in FIG. 21 it is possible to obtain a very narrow concentrated swath of material having a very high concentration with a sharp well defined edge. This embodiment of my method can be very effectively utilized to spread salt or ice melting chemicals, or sand on highways, streets and the like.

Figure 22:

FIG. 22 shows still another specific embodiment of my method of distributing material. In this figure there is illustrated flaps 46, 48 and 50 in lowered position. With this setting of the flaps there is formed in addition to the outer vortex a, a second vortices f adjacent the end portions of wing 42. This flap setting is well suited to produce a very wide distribution pattern of material. Material ejected or dispensed along outlet openings near flaps 46, 48 and 50 will be thrown outwardly by the vortices thereby producing a very wide swath. The outward flow of material is further enhanced by vortex a and distributed in a very wide pattern.

The trailing vortex system utilized in my method of aerial distribution can be used to distribute either dry material or liquid material, or if the hopper is partitioned it can be used to distribute a combination of dry and liquid materials. The liquid material is affected by the trailing vortex system in basically the same manner that dry material is affected. In my method of aerial distribution the airplane or apparatus, when distributing the material, is flown at any suitable altitude, preferably in the range of 5 to 100 feet, more preferably in the range of 5 to 50 feet, and most preferably in the range of from 5 to 30 feet. The apparatus or airplane is maintained at any suitable velocity, preferably in the range of 60 to 170 miles per hour, more preferably in the range of 80 to 140 miles per hour, and most preferably in the range of 90 to 120 miles per hour. The material being dispersed can be distributed at any suitable rate, preferably in the range of 1 to 50 pounds per second, more preferably in the range of 5 to 35 pounds per second, and most preferably in the range of 10 to 25 pounds per second. The angle of attack of the airplane when dispersing the material in accordance with my method is preferably maintained in the range of 3 to 16 degrees, more preferably in the range of 5 to 12 degrees and most preferably in the range of 6 to 9 degrees. The blower discharge rate can be any suitable rate, preferably in the range of 140 to 350 cubic feet per second for an airplane having a foot span in the range of 40 to 50 feet.

A specific embodiment of the method of aerial distribution of my invention comprises spreading material with an airplane provided with a hopper, metering valve, blower ducts within the wings of the airplane, flaps, and a slot adjuster flap. A stream of air is expelled rearwardly from the top trailing edge of the wing forwardly of the flap of the airplane, while in level flight at an elevation in the range of 3 to 50 feet, at a velocity relative to the airplane of equal or greater than the forward air velocity of the plane, while simultaneously finely divided material is dispensed in the air stream at a predetermined rate to fluidize same prior to its expulsion from the airplane. Air vortices are formed at predetermined locations along the wing. The dispensed material is dispersed in a predtermined manner by the vortices to form the desired distribution pattern on the ground surface.

Another specific embodiment of the method of my invention particularly adapted to distribute dispersible material in wide swaths having a relatively uniform material dispersion concentration includes the steps of entraining finely divided granular material into a moving enclosed stream of air to fluidize the material, setting the flaps on the wing of the airplane used in the method in neutral positions thereby forming a trailing vortex system having well defined large air vortices at the wing tips, expelling the stream of air and entrained material rearwardly from the top trailing edge of the wing into the trailing vortex system of the wing forwardly of the flaps along approximately three-fourths the length of the wing on the inboard portions thereof at a velocity equal to or in excess relative to the plane of the forward velocity of the plane. The airplane is maintained during the distributing of the material at an altitude in the range of 5 to 30 feet above the ground, at a velocity in the range of 90 to 120 miles per hour with the wing angle of attack in the range of 6 to 9 degrees. The outward flow of air generated by the trailing vortex system is used to distribute dry material in a wide swath having a width in the range of 40 to 60 feet and a distribution concentration in the range of 150 to 250 pounds per acre over the ground surface.

Basically the same method steps described above can be used to obtain a relatively wide swath when distributing a liquid material. In this embodiment of my invention liquid material is sprayed rearwardly into the trailing vortex system along the trailing edge of the wing at a velocity equal to or in excess of the forward velocity of the airplane. The airplane is maintained at the same velocity, altitude and angle of attack as descirbed in the previous embodiment relating to the distribution of dry material.

Still another specific embodiment of the method of invention is particularly adapted to distribute material in narrow well defined swaths. The material is distributed with a plane provided with flaps. Dry granular material is entrained in a moving enclosed stream of air, and a trailing vortex system having inwardly rotating air vortices, relative to the lower surface of the wings, spaced at intermediate positions on the wing is caused to form. The stream of air is expelled rearwardly from the top trailing surface of the wing along the inboard portion only into the trailing vortex system of the wing. The trailing vortex system is formed by setting the outboard flaps down, and maintaining the inboard flaps in neutral position. The wing of the airplane is maintained at an altitude in the range of 30 to 100 feet above the ground, and the airplane velocity maintained in the range of 80 to 120 miles per hour with the wing angle of attack in the range of 5 to 10 degrees. A very narrow swath in the range of 10 to 30 feet is thereby produced when the entrained material is ejected into the trailing vortex system of the wing and thrown inwardly by the aforementioned inwardly rotating vortices.

Still another embodiment of my invention can be used to distribute liquid material in a narrow swath. When distributing liquid material in a narrow swath the liquid is sprayed rearwardly at a velocity equal to or slightly in excess of the forward velocity of the plane along the inboard portions of the wings into the trailing vortex system of the wing. The outboard flaps are in lowered position thereby creating inwardly rotating vortices at the intermediate portions of the wing. These vortices have a tendency to throw the liquid sprayed rearwardly in an inward direction thereby concentrating the distributed material in a very narrow swath. The velocity, altitude, angle of attack, etc. in this specific method embodiment are the same as in the aforedescribed specific embodiment for distributing dry material with the exception that the material in liquid form is sprayed instead of being entrained in an enclosed stream of air.

Figure 23:
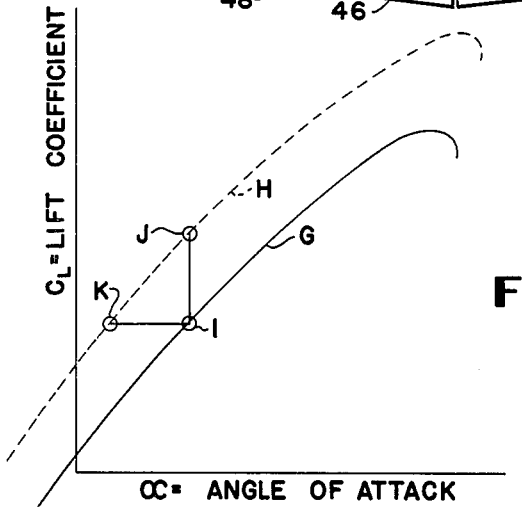
FIG. 23 is a graph showing the coefficient of lift vs. angle of attack relationship in flight between airplane wing with the slot adjuster flaps open and a wing having the slot adjuster flaps closed to the minimum clearance.
Figure 18:
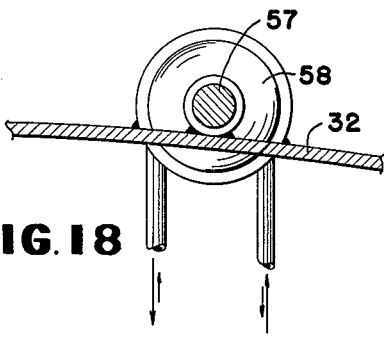
FIG. 18 is a detail view of the hopper closure actuating mechanism.

The graph, FIG. 23, of the lift coefficient versus the angle of attack serves to illustrate the use of my invention and advantages of my apparatus for distributing material relative to maneuverability and operability of the airplane, and safety of the operator pilot is concerned. In FIG. 23 the solid line $g$ is a curve representing the relationship betwen lift coefficient and angle of attack for the wing of my airplane with the slot adjusters in open position. The dotted line $h$ is a curve for the wing of my airplane with the slot adjuster flaps closed to the minimum slot dimension with the air issuing forth at a velocity greater than the forward air speed of the airplane. The lift coefficient $C_L$ is in reference to the formula $$\text{Lift} = C_L \frac{P}{2} V^2 S$$

where $C_L$ is the lift coefficient, P is the air density, V is the velocity of the airplane, and S is the wing area. For purposes of illustration and teaching the formula above is simplified by assuming that the "lift" of the airplane wing is equal to the weight of the plane. This is true in straight unaccelerated flight. Therefore, weight=$C_L V^2$ (constant). Point $i$ on the graph shown in FIG. 23 represents a value for the lift coefficient at a given velocity with the slot adjuster flaps open and with air and material being ejected rearwardly at approximately the same velocity as the forward speed of the airplane which conditions are typical of an airplane distributing material. At the end of the swath the operator pilot will in practice close the slot adjuster flaps to the aforementioned minimum slot dimension, which reduces the cross sectional area of the opening. Since approximately the same amount of air must pass through the nearly closed slot adjuster flaps through an opening greatly reduced in cross section than is passed with the slot adjuster flaps open, the velocity of the air issuing forth will be materially increased. Under these conditions the line $h$ represents the relationship between the lift coefficient and the angle of attack of the airplane. When the pilot under the conditions indicated at point $i$ maintains the same angle of attack, but subsequently closes the slot adjuster flaps the new conditions are indicated at point $j$. As is evident on the graph the lift coefficient has increased in value. Applying this to the formula weight equals $C_L V^2$ (constant), it is evident that when the velocity of the plane is maintained the lift is increased thereby allowing the plane to climb. This is exactly what the pilot wishes to do at the end of a swath since he must gain altitude in order to turn the plane to approach the field to begin a new swath. By closing the adjuster flaps and metering valve, which in practice is done with a single control, the pilot sets into play very favorable aerodynamic conditions which allow him to complete his turn in a shorter distance in a shorter time with greater safety. However, if he does not wish to increase his lift to climb he can maintain the same angle of attack and decrease his velocity, or he can maintain the same velocity and decrease his angle of attack thereby reducing the power requirements on the airplane engine. After the pilot has made his turn at a relatively high altitude preparatory to beginning a new swath with the slot adjusters closed he must lose altitude since the turn is ordinarily made at an altitude higher than desired for spraying or distributing material. When the pilot, while maintaining a constant angle of attack, opens the slot adjuster flaps the lift coefficient is decreased. The decrease in the lift coefficient causes the airplane to lose altitude when the velocity of the plane is held constant. In alternative, the decrease in the lift coefficient can be compensated by increasing the velocity of the plane if level flight is desired. Therefore, in practice the pilot upon opening the slot adjuster flaps can allow the plane to lose altitude until at the desired level and he can then increase his velocity to maintain this desired altitude. These conditions are very desirable in the distribution of material since the turns at the end of the swath must in the interest of safety be made at a relatively high safe altitude but should be accomplished in a minimum of distance, and the velocity of the plane increased after the turn to assure an even distribution and also cover as much acreage as possible. Therefore, it is apparent that the combination apparatus of my invention is admirably adapted to distribute material with an accuracy and control impossible to obtain with prior art spraying apparatus and methods, and the apparatus of my invention is very maneuverable and safe and well adapted to efficiently distribute material.

The examples which follow illustrate the experimental techniques and the results obtained in testing and proving the superiority of the method and apparatus of my invention. These tests were conducted with a model patterned after a specific embodiment of my invention and the velocities, feed rates, angles of attack, altitudes, flap settings, materials, etc., are not to unduly limit the scope of my invention.

*Example I*

In order to test the performance characteristics of the material distribution apparatus of the invention and the method of distribution a wing model was made. The model consisted of an aircraft wing having a semi-span of seventeen feet ten inches, a root chord of 64.5 inches, a tip chord of 43 inches, and an area of eighty square feet. The wing was mounted on a large vertically disposed surface, serving as an endplate, supported on the side of the load platform of a truck. The wing was arranged on the endplate so that it could be tilted relative to the ground. The model wing was constructed of wood and fitted with full-span 25 percent chord trailing edge flaps hinged on the lower profile surface. The flaps were divided into four spanwise segments, each capable of individual deflection with the outboard section corresponding to an aileron. Within the wing model was provided interior air ducts which extended longitudinally along the wing and had outlet openings on the top surface of the wing immediately forward of the flaps. Adjustable adjuster slot flaps were provided to selectively control the outlet openings of the air ducts. The adjuster slot flaps were relatively small pivotally mounted flaps positioned forwardly of the flaps. Air was pumped into the wing model by a motor and blower mounted on the load platform of the truck and connected to the inlets of the ducts in the wing. A rotary metering gate driven by a separate motor was fitted to a hopper and arranged so that dry material could be introduced into the inlet ends of the ducts. The wing model was mounted on the vertical surface or endplate at a height of approximately 15 feet above the ground surface.

Tests were conducted by driving the truck at a relatively high rate of speed down an airport runway. Dry granular material was introduced through the rotary metering gate into the ducts of the wing model while at the same time air was pumped into ducts from the aforementioned motor and blower arrangement. The mixture of air and material was expelled through the duct outlets and controlled by the adjuster slot flaps. The wing was passed over a series of open topped cans adapted to receive a portion of the material distributed over the area that they covered. Two rows of cans were spaced 15 feet apart with the cans spaced one foot from each other were arranged on the runway. After the wing model was passed over the cans at a high rate of speed closely approximating the conditions encountered by an aircraft wing in actual flight, the material in the cans deposited thereon during the test run was carefully weighed, recorded, and calculated on the basis of pounds per acre. The results were then plotted on a graph with the pounds per acre on the ordinate versus feet from the endplate on the abscissa. An average value was determined for each point by using the values obtained from both rows of cans and also plotted on the graph.

A test run with the aforedescribed model was made with the angle of the wing set at 14.2 degrees with all of the flaps up at a speed of 58 miles per hour. Rice was distributed in the blowing system at a rate of 100 pounds in 16 seconds which represents a discharge rate of 163 pounds per acre. The rice deposited in the cans was collected, measured, and the aforementioned calculations made. The graph of FIG. 24 depicts the results of the test. In broadcasting or distributing material to crops and the like it is desirable that there be an even uniform distribution of material over the entire wing swath. There is an inevitable tapering off of the material distribution rate at the tip of the wing and beyond. It is desirable that the distribution pattern of successive swaths be such that adjacent swaths overlap sufficiently and in such a manner that the additive effects of the material distributed along the overlapped edges results in a relatively uniform overall distribution pattern. In the graph (FIG. 24) a mirror image of the test swath was plotted on the right-hand side with the edges of the imaginary swath overlapping in order to determine the overall distribution pattern of the overlapping swaths.

In the graph (FIG. 24) the lines indicated as $m$ and $n$ represent the individual results of each of the two rows of cans converted to pounds per acre. The line $o$ represents the average value of the values of $m$ and $n$. The solid heavy line $p$ is the overall result of combining and overlapping the adjacent swaths in the manner described hereinbefore. Note that lines $o$ and $p$ coincide to the left of point $r$ since this is the end of the overlapped portion. As is evident from the graph the distribution pattern that resulted from the tests is very good closely approximating a straight line.

*Example II*

A second experimental run was made with the apparatus described in Example I. The same type of material was distributed, namely rice, with the velocity being 58 miles perhour, and the wing angle of attack maintained at 3 degrees. The rate of distribution was 100 pounds in 16 seconds, or 375 pounds per minute, the same distribution rate as used in Example I. The rice was collected in two rows of boxes and the results calculated in pounds per acre as in Example I. In this run however, the three flap sections on each wing were deflected 19 degrees in the manner illustrated in FIG. 22. An examination of the results plotted on a graph similar to the graph shown in FIG. 24 indicated that there was a relatively high pile-up of material about six feet from the endplate and relatively even drop-off of material extending out to approximately 29 feet. This is the result one would expect from the flap setting used, since the flaps caused the formation of relatively strong vortices on the outboard ends of the flap 50 and a second set of vortices on the tips of the wings. The flap settings and vortices so produced are illustrated in FIG. 22 of the drawings. The vortices adjacent the ends of the wings had the effect of throwing the material outwardly far beyond the tip of the wing. In the portion of the wing adjacent the two inboard flaps the pressure coefficient of the wing was relatively constant indicating the absence of any significant vortices formations. Since there was no vortices formed at this point or location on the wing, the material dropped almost straight downwardly to the ground to cause a high build-up in the central region of the swath. The vortices $f$ and $a$ had the effect of throwing the material released behind the outboard portions of the wing outwardly to form a relatively wide swath. While the swath produced by the flap setting just described may not be desirable for applications demanding an even distribution of material, it does illustrate very well the new method of control of distributing materials of my invention.

*Example III*

Another experimental run with the apparatus described in Example I was made using the usual commercial pelleted fertilizer as the material being distributed. The run was made at a velocity of 58 miles per hour, with an angle of attack of 14.2 degrees, and with all the flaps up, which conditions are generally similar to the run made in Example I with the exception of the material. The results plotted on a graph in the same manner as described in Example I. The graph showed a pattern of distribution very similar to the pattern depicted in FIG. 24 of the drawings. The swath had a total width of 42 feet and an average distribution concentration of approximately 210 pounds per acre. The overall concentration of dispersed material of adjacent swaths so produced was relatively even, including the portion that was overlapped. This run illustrated that my method and apparatus for distributing material can be used equally well with different types of material.

*Example IV*

Another experimental run was made with such fertilizer being the material being distributed, and with the conditions very similar to run No. 2 described in Example II. The angle of attack was maintained at three degrees, the velocity was 58 miles per hour, and the three inboard flaps on each wing were positioned in a down position at an angle of approximately 19 degrees. The results of the run were plotted on a graph in the manner described in Example I. The distribution pattern indicated on the graph was very similar to the distribution pattern obtained in Example II. The graph indicated a relatively large pileup of material at a point about five feet from the endplate, and a broad swath with the material gradually diminishing in concentration as the distance from the endplate increased. This concentration of distribution of the material was predicted for the reason set forth in Example II, namely, that the vortices have the effect of throwing the material expelled along the outboard section of the wing outwardly, with the inboard material distributed on the inboard sections free to drop relatively straight down.

*Example V*

A series of liquid distribution tests were conducted to evaluate the effect of flap position, and the effect of a rearwardly directed stream of air expelled from the trailing edge of the wing surface. Basically the same type of apparatus was used as in Examples I to IV, namely a wing mounted on an endplate supported on a truck. The wing model was equipped with nozzles spaced at one foot intervals along the span, suitable conduits, and a liquid pumping system. A solution of strontium chloride and water was sprayed from the nozzles as the wing model was moved through the air at a relatively high rate of speed. The distribution pattern of the swath was determined by placing plastic collection plates, each nine inches by four inches, at one foot intervals along a line normal to the swath axis. The concentration distribution was determined by washing the spray deposit after a run had been made from each of the plastic plates with 25 cc. of dilute HCl. The concentration of strontium chloride in this known volume of wash solution was then determined by a flame spectrophotometer. Knowing concentration of strontium chloride in the wash solution, the total amount of strontium chloride that had been deposited on the plate was computed. Since the concentration of strontium chloride in the original spray mixture was known, the actual volume of spray that had been deposited on the plate was computed. The plate area was 36 square inches, and the spray per unit area could then be determined. The final figure of spray density in gallons per acre for each plate was then determined and plotted on a graph.

17

A test run was first made at a velocity of 58 miles per hour with the angle of attack at 10 degrees. The flaps were all deflected at 30 degrees, but without the rearwardly directed stream of air being expelled from the trailing edge of the wing. An examination of the resulting graph of distribution in gallons per acre versus distance from the wing center line indicated a relatively narrow swath with a large build-up of material or spray occurring approximately 3 feet from the tip of the wing model. This pattern was not a desirable one for use in the distributing of material, since it was not uniform or wide, and a large pile-up of material occurred in the area that in actual practice is normally overlapped. A swath pattern of this type would produce relatively high concentrations in the over-lap portions of adjacent swaths.

*Example VI*

Using the same apparatus evaluation procedures, another experimental test run was made with the same flap settings and velocity, but with the blower expelling a stream of air rearwardly from the top trailing edge of the wing at a velocity equal to or slightly in excess of the forward velocity of the wing. When the results of the spray concentration were plotted on a graph after determining the concentrations in the manner identical to the manner described in Example V, it was indicated that a relatively wide swath was formed having a slight but broad build-up of material in the area off the tip of the wing but the build-up of material did not approach the degree of build-up that was apparent in the test run in Example V. The width of the swath was approximately twice the width of the wing. The swath edge distribution concentration tapered off uniformly adapting it to be overlapped to obtain a relatively uniform overall concentration pattern. It was apparent that the use of the rearwardly stream of air materially enhanced the outboard flow of material which resulted in a wide swath distribution pattern.

*Example VII*

A test comparison of liquid distribution was made with a single nozzle positioned in two different locations near the end of the wing model. This nozzle was the sole source of liquid droplets being distributed. Two tests were run both with the rearwardly stream of air emanating from the trailing surface of the wing for the purpose of determining the effect of different relative positions of the nozzle to the strong vortex at the tip created by the combination of the wing and the rearwardly moving air. The concentration distribution pattern was determined for both runs, graphed, and examined. With the nozzle ½ foot from the tip there occurred a relatively large build-up of material at a point approximately 3 feet from the tip of the model wing. With the nozzle disposed at 1½ foot distance from the wing tip the concentration pattern was more uniform and showed a much wider dispersion of the liquid into a wide swath. This test proved that a wider swath can be acquired by the combination of a strong vortex and proper placement of the emitting nozzle with respect thereto.

*Example VIII*

Additional liquid distribution test runs were made and graphed using the model wing and spray apparatus thereon. Various angles of attack, velocities, and flap settings were used. The overall results of the experimental runs indicated that the trailing vortex system created in accordance with the new method of my invention was equally adapted to disperse or spread either dry granular material or liquid sprayed rearwardly in the manner described. The test further proved that consistent and predictable distribution swath patterns can be obtained using my new method and my new apparatus particularly adapted for practicing the method.

While I have described and illustrated preferred specific embodiments of my invention, it is to be understood that the method of, and apparatus for, the distribution of material of my invention disclosed can be accomplished and made in other forms than herein described or suggested without departing from the spirit of my invention or the scope of the following claims.

I claim:

1. An apparatus for distributing material, comprising an airplane having a fuselage including a cockpit, an engine having independent throttle control in said cockpit, landing gear, and a single wing centrally mounted low on said fuselage, ailerons on the end portions of said wing, and three separate hingedly mounted flaps on the trailing edge of each extending portion of said wing controllable from within the cockpit, a means for distributing material while said airplane is in flight comprising, a hopper mounted in said fuselage forwardly of said cockpit, said hopper having a relatively large top inlet opening, a hingedly mounted closure means covering said inlet opening, a first outlet opening in the bottom of said hopper, sloping hopper walls adapted to channel material when disposed in said hopper toward said first outlet opening, a rotary metering valve for said material communicating with said first outlet opening, said metering valve having a housing having a transverse, horizontally extending, cylindrical shaped recess provided with top and bottom openings, a vaned rotary valve body disposed in said recess, a shaft rotatably supporting said valve body, a worm gear fixed to an end of said shaft, a variable speed hydraulic motor provided with a shaft having a helical thread operatively engaging said worm gear, a means to selectively block material when disposed in said hopper from portions of said top opening in said housing, said last-mentioned means comprising a rectangular frame disposable in sealed relation to said top opening, thin vertically extending spaced dividers secured to said frame, a plurality of flat removable plates adapted to selectively cover the opening in said frame formed by said spaced dividers, and bolt means for securing said removable plates to said frame, an air intake in the forward end of said fuselage, a compressor mounted below said engine having an intake communicating with said air intake, said compressor including a longitudinally extending shaft, a mounting means for said shaft, and a fan and pulley fixed to said shaft, a second engine mounted in said fuselage below said first mentioned engine and rearwardly of said compressor, independent throttle control means in said cockpit for said second engine, a pulley on said second engine, a belt means connecting said compressor and second engine in driving relation, a first longitudinally extending duct connected at one end to said compressor, a distribution duct in each of said wing portions extending the entire length thereof, said metering valve communicating with said distribution duct, said distribution ducts each communicating with the other end of said first duct having outlets extending the entire length of the wing positioned forwardly of the leading edges of the flaps and ailerons, a plurality of upstanding spaced walls in said distribution ducts, the number, and spacing of the wall portions adjacent the metering valve corresponding to the number and spacing of the dividers in the frame with said wall portions and dividers being in alignment, said walls adapted to channel material and air, when flowing in said ducts, to various portions of the outlets in said wing, a plurality of hingedly mounted panels in said first duct positioned ahead of said metering valve adapted to selectively control the flow of air through portions defined by said walls of said distribution ducts, a means to control the position of said panels from within the cockpit, distribution baffles positioned between said walls adjacent the outlets of said distrigution ducts, a plurality of inspection and cleaning doors in the top surface of said wings forming a portion of said distribution ducts, adjuster flaps for controlling the outlet openings of the distribution ducts, said adjuster flaps comprising pivotally mounted flaps corresponding in length to the adjacent associated flap or aileron, a hinge means mounted on the top surface of the wing forwardly of the flaps and secured to said adjuster flaps and wing, a means to control the movements and positions of said adjuster flaps from within the cockpit, a means to distribute liquid material comprising, a second outlet opening in said hopper, a means to selectively cover said second opening, a liquid fluid pump having an inlet communicating with said second outlet opening, spaced nozzles mounted on said flaps arranged to point in a rearward direction, conduit means operatively connected to said fluid pump and said nozzles, and a cockpit ventilating means comprising a second duct communicating with said first duct and said cockpit, said apparatus adapted in use to uniformly and efficiently distribute material which material can be either liquid or dry granular form.

2. An apparatus for distributing material comprising, an airplane having a fuselage including a cockpit, an engine, a wing mounted on said fuselage, ailerons on said wing and flaps on the trailing edge of said wing controllable from within the cockpit, means for distributing material while said airplane is in flight comprising, a hopper mounted in said fuselage, an inlet opening in said hopper, a closure means for said inlet opening, a first outlet opening in the bottom of said hopper, a rotary metering valve for said material communicating with said first outlet opening, means to close off selected portions of said outlet opening in said hopper, an air intake in the forward end of said fuselage, a compressor having an intake communicating with said air intake, and having an outlet, a second engine mounted in said fuselage arranged in driving relationship to said compressor, a first longitudinally extending duct connected to said outlet of said compressor, a distribution duct in each of the wing portions extending the entire length thereof, said distribution ducts each communicating with the other end of said first duct and having outlets in the wing portions positioned generally forwardly of the leading edge of the flaps, said metering valve communicating with said distribution ducts, a plurality of spaced walls in said distribution ducts adapted to channel material and air when flowing in said ducts to various portions of the outlets in said wing, said walls dividing the distribution ducts into separate channels, a means for selectively closing off each of said channels formed by said walls, means for controlling the position of said aforementioned means from within the cockpit of the airplane, distribution baffles positioned between said walls adjacent to the outlets of said distribution ducts, adjuster flaps for controlling the outlet openings of said distribution ducts, hinge means for said adjuster flaps, means to control the movement and positions of said adjuster flaps from within the cockpit, means to distribute liquid material comprising, a second outlet opening in said hopper, a fluid pump having an inlet communicating with said second outlet opening, spaced nozzles mounted on said flaps, conduit means operatively connected to said fluid pump and said nozzles, said apparatus adapted in use to uniformly and efficiently distribute material to crops, which material can be either liquid or in dry particle form.

3. An apparatus for distributing material comprising, an airplane having a fuselage including a cockpit, an engine, a wing mounted on said fuselage, ailerons and flaps on the trailing edge of said wing controllable from within the cockpit, a means for distributing material while said airplane is in flight comprising, material storing means mounted in said fuselage, an inlet opening in said material storing means, a closure means for said inlet opening, an outlet opennig in the bottom of said material storing means, a metering valve for said material communicating with said outlet opennig, means to close off selected portions of said outlet opening, an air intake in the forward end of said fuselage, a compressor having an intake communicating with said air intake and an outlet, means operatively connected to said compressor to drive same, a conduit for air connected to said outlet of said compressor, distribution ducts in each of the wing portions, said distribution ducts each communicating with the other end of said conduit and having outlets in the wing portions positioned generally forwardly of the leading edge of said flaps, said metering valve communicating with said distrbution ducts, adjustable means positioned to control the outlet openings of said distribution ducts, said adjustable means including a plurality of pivotally mounted slot adjuster flaps positioned forwardly of the leading edge of the flaps and adapted to vary the outlet opening of the distribution ducts, and hinge means on the forward edge of the adjuster flaps secured to the center portion of the wing, and means to control the movement and position of said adjustable means, and said apparatus adapted in use to uniformly and efficiently distribute material from the air onto the ground.

4. An apparatus for distributing liquid comprising an airplane having a fuselage including a cockpit, an engine, and a wing having flaps mounted on said fuselage, an air intake in the forward end of said fuselage, a compressor having an intake communicating with said air intake and having an outlet, a second engine mounted in said fuselage arranged in driving relationship to said compressor, a first longitudinally extending duct connected to said outlet of said compressor, a distribution duct in each of the wing portions extending the entire length thereof, said distribution ducts each communicating with the other end of said first duct and having outlets in the wing portion positioned generally forwardly of the leading edge of the flaps, a plurality of spaced walls in said distribution ducts adapted to channel air when flowing in the ducts to various portions of the outlets in said wings, said walls dividing the distribution ducts in separate channels, distribution baffles positioned within said walls adjacent the outlets of said distribution ducts, adjuster flaps for controlling the outlet openings of said distribution ducts, said adjuster flaps comprising pivotally mounted flaps corresponding in length to the adjacent associated flap, hinge means for said adjuster flaps, a means to control the movement and positions of said adjuster flaps from within the cockpit, means to distribute liquid material comprising, a hopper mounted in said fuselage, an inlet opening in said hopper, an outlet opening in said hopper, a fluid pump having an inlet communicating with said outlet opening, a variable speed motor driving said fluid pump, spaced nozzles mounted on said flaps, means to selectively shut off the flow through said nozzles, conduit means operatively connected to said fluid pump and said nozzles, said apparatus adapted in use to uniformly and efficiently distribute liquid in a variety of swath widths and at varying distribution rates.

5. An apparatus for distributing dispersible material comprising, an airplane having wings adapted to produce a trailing vortex system when in motion, a plurality of adjustable flaps on said wing adapted to influence and control the vortex trailing system of said wing when in motion, a blower means, duct means connected to said blower means having outlet slots in said wings in the top trailing portion of the wing surface forwardly of the flaps for expelling with said blower means a stream of air rearwardly at a velocity equal to or greater than the forward velocity of the airplane when in flight, an auxiliary engine for operating said blower means, slot adjuster means positioned to control the outlet slots, means to control the movement and position of said slot adjuster means, a means for expelling dispersible material into the trailing vortex system of the wing and utilizing same to distribute the dispersible material in a predetermined swath pattern.

6. A method of aerial distribution of dry finely divided materials in wide swaths having a relatively uniform material dispersion with a plane having a wing provided with a plurality of flaps comprising, (1) entraining finely divided granular dry material into a moving enclosed stream of air, (2) setting the flaps on the wing up in a neutral position thereby forming a trailing vortex system having well defined, large air vortices at the wing tips, (3) expelling the stream of air and entrained material rearwardly from the top trailing surface of the wing into the trailing vortex system of the wing forwardly of the flap along approximately three-fourths the length of the wing on the inboard portion thereof at a velocity equal to or in excess relative to the plane of the forward velocity of the plane, (4) maintaining the wing at an altitude in the range of 5 to 30 feet above the ground and a velocity in the range of 90 to 120 miles per hour with the wing maintained at an angle in the range of 6 to 9 degrees relative to the horizontal and utilizing the outwardly flow of air generated by the trailing vortex system to distribute the entrained material in a wide swath having a width in the range of 40 to 60 feet, applying at a rate in the range of 150 to 250 pounds per acre over the ground surface.

7. A method of aerial distribution of liquid material in wide swaths having a relatively uniform material dispersion with a plane having a wing provided with flaps comprising, (1) setting the flaps up in a neutral position thereby forming a trailing vortex system having large air vorticles at the wing tips, (2) expelling a stream of air rearwardly from along the entire top rear surface of the wing into the trailing vortex system of the wing forwardly of the flaps at a velocity equal to or in excess relative to the wing of the forward velocity of the plane, (3) spraying the liquid rearwardly into the trailing vortex system along the entire trailing edge of the wing, (4) maintaining the wing at an altitude in the range of 5 to 30 feet above the ground, and a velocity in the range of 90 to 120 miles per hour with the wing maintained at an angle in the range of 6 to 9 degrees relative to the horizontal and utilizing the powerful outward flow of the vortex system to distribute the entrained material in a wide swath having a width in the range of 40 to 60 feet, applying at a rate in the range of 150 to 250 pounds per acre over the ground surface.

8. A method of aerial distribution of dry finely divided material in narrow swaths having a relatively uniform material dispersion with a plane having a wing provided with outboard and intermediate flaps comprising, (1) entraining finely divided dry material in a moving enclosed stream of air, (2) forming a trailing vortex system having inwardly rotating air vortices relative to the lower surface of the wing spaced at intermediate positions on the wing, the nature of the vortex system determined by a selective positioning of the intermediate flaps, (3) expelling the stream of air rearwardly from the top trailing surface of the wing along the inboard portion only into the trailing vortex system of the wing forwardly of the flap at a velocity equal to or in excess, relative to the plane, of the forward velocity of the plane, (4) expelling a stream of air rearwardly from the rest of the wing, (5) maintaining the wing at an altitude in the range of 30 to 100 feet above the ground and a velocity in the range of 80 to 120 miles per hour with the wing maintained at an angle in the range of 5 to 10 degrees relative to the horizontal and utilizing the inwardly rotating vortices of the trailing vortex system to confine the distribution of the entrained material in a very narrow swath having a width in the range of 10 to 30 feet.

9. A method of aerial distribution of dry finely divided material with an airplane provided with a hopper, metering valve, blower, ducts within the wings of the airplane, flaps, and an adjustable flap comprising, (1) expelling rearwardly air from the top trailing edge of a wing forwardly of the flap of an airplane while in level flight at an elevation in the range of 3 to 50 feet at a velocity, relative to the airplane, equal or greater to the forward air velocity of the plane, (2) simultaneously dispensing finely divided material in the air stream at a predetermined rate prior to its expulsion from the airplane, (3) forming air vortices at predetermined locations along the wing, and (4) dispersing the expelled material with the vortices to form a predetermined distribution pattern on the ground surface.

10. A method of aerial distribution of dry finely divided materials with an airplane having a wing provided with a flap comprising, (1) entraining finely divided dry material in a moving enclosed stream of air, (2) forming air vortices at intermediate positions along the wing with the proper setting of a flap, (3) expelling the stream of air rearwardly from the top trailing surface of a wing forwardly of said flap at a velocity equal to or in excess, relative to the airplane, of the forward air velocity of the airplane into the previously mentioned air vortices and utilizing same to distribute the entrained material in a predetermined pattern over the ground surface.

11. A method of aerial distribution of liquid in a very narrow swath with an airplane provided with a plurality of flaps comprising, (1) expelling from an airplane while in flight a stream of air rearwardly from the top trailing portion of the wing surface forwardly of the flaps at a velocity equal or in excess, relative to the wing, of the forward air velocity of the airplane, (2) setting the inboard wing flaps down thereby forming a predetermined vortex system having inwardly rotating air vortices adjacent the inboard portions of the wing, (3) spraying liquid material into the resulting trailing vortex system of the wing only along the inboard portions of the wing and utilizing said vortex system to distribute the material in a predetermined narrow swath over the ground surface.

12. A method of aerial material distribution with an airplane provided with flaps comprising, (1) expelling from an airplane while in flight a stream of air rearwardly from the top trailing portion of the wing surface forwardly of the flap at a velocity equal or in excess, relative to the wing, of the forward air velocity of the airplane, (2) setting the inboard flaps down hereby forming a predetermined vortex system having inwardly rotating air vortices adjacent the inboard portions of the wing, (3) dispersing an entraining material into the resulting trailing vortex system of the wing only along the inboard portions of the wing and utilizing same to distribute the material in a narrow predetermined swath pattern over the ground surface.

13. A method of aerial material distribution with an airplane provided with flaps comprising, (1) expelling from an airplane while in flight a stream of air rearwardly from the top trailing portion of the wing surface forwardly of the flaps at a velocity equal or in excess, relative to the wing, of the forward air velocity of the airplane, (2) setting the flaps on the wing up in neutral positions thereby forming a predetermined vortex system having well defined, large air vortices at the wing tips, (3) dispersing a dispersible material into the resulting trailing vortex system of the wing and utilizing same to distribute the material in a wide swath over the ground surface.

14. An apparatus for distributing material comprising, an airplane having a fuselage including a cockpit, an engine, a wing mounted on said fuselage, flaps on the trailing edge of said wing, and a means for distributing material while said airplane is in flight comprising, material storing means mounted in said fuselage, an outlet opening in said material storing means, a metering valve for said material communicating with said outlet opening, an air intake in the forward end of said fuselage, compressor means having an intake communicating with said air intake and an outlet, means operatively connected to said compressor means to drive same, a conduit connected to the outlet of said compressor means and communicating with said metering valve, distribution ducts in said wing, said distribution ducts communicating with said conduit and having outlets in the wing portions positioned generally forwardly of the leading edge of said flaps, slot adjuster flaps positioned forwardly of the leading edge of the flaps and adapted to vary the outlet opening of the distribution ducts, and means adjustably securing said slot adjuster flaps to said wing.

15. An apparatus for distributing liquid comprising, an airplane having a fuselage including a cockpit, an engine, and a wing having flaps mounted on said fuselage, an air intake in the forward end of said fuselage, compressor means having an outlet and an intake communicating with said air intake, means driving said compressor means, a first duct connected to said outlet of said compressor means, a distribution duct in each of the wing portions, said distribution ducts each communicating with said first duct and having outlets in the wing portions positioned generally forwardly of the leading edge of the flaps, slot adjuster flaps for controlling the outlet openings of said distribution ducts, support means for said slot adjuster flaps, a means to control the movement and positions of said slot adjuster flaps, means to distribute liquid material comprising, a hopper mounted in said fuselage, an inlet opening in said hopper, an outlet opening in said hopper, fluid pump means having an inlet communicating with said outlet opening, a means driving said fluid pump means, spaced nozzles mounted on said flaps, conduit means operatively connected to said fluid pump means and said spaced nozzles, said apparatus adapted in use to uniformly and efficiently distribute liquid in a variety of swath widths and at varying distribution rates.

References Cited by the Examiner

UNITED STATES PATENTS

| | | | |
|---|---|---|---|
| 1,580,301 | 4/26 | Johnson | 244—136 |
| 1,584,945 | 5/26 | Johnson | 244—136 |
| 2,250,762 | 7/41 | Haberlin | 244—136 |
| 2,426,771 | 9/47 | Harp | 244—136 |
| 2,582,678 | 1/52 | Carberry | 244—136 |
| 2,659,556 | 11/53 | Doblhoff | 244—136 |
| 2,812,913 | 11/57 | Nissen | 244—136 |

FERGUS S. MIDDLETON, *Primary Examiner.*